United States Patent
Piokins, Jr.

[11] Patent Number: 5,109,719
[45] Date of Patent: May 5, 1992

[54] GYROPOWER UNIT

[76] Inventor: Oscar W. Piokins, Jr., 1416 Mimosa La. NW., Lenoir, N.C. 28645

[21] Appl. No.: 653,507

[22] Filed: Feb. 11, 1991

[51] Int. Cl.$^5$ .............................................. G01C 19/02
[52] U.S. Cl. .......................................... 74/5.37; 74/64
[58] Field of Search ................... 74/5.37, 5.34, 63, 64, 74/5.22, 5.4, 845; 475/267; 310/74

[56] References Cited

U.S. PATENT DOCUMENTS

| | | | |
|---|---|---|---|
| 2,088,834 | 8/1937 | Briggs | 475/267 X |
| 2,960,889 | 11/1960 | Keyser | 475/268 |
| 3,439,548 | 4/1969 | Horvath | 74/5.34 |

FOREIGN PATENT DOCUMENTS 1308410 9/1962 France ................... 74/5.22

Primary Examiner—Rodney H. Bonck

[57] ABSTRACT

A device for generating rotational force about an axis converts the angular velocity of a ferromagnetic gyro disk turning at high speeds to rotational power delivered at a central power take off shaft by precession of the ferromagnetic disk induced by an electromagnet.

7 Claims, 1 Drawing Sheet

GYROPOWER UNIT

BACKGROUND AND SUMMARY OF THE INVENTION

The invention relates to power sources in general and in particular to rotational power sources. The present invention produces rotational power by the action of two units mounted at opposite ends of a beam, a power take off shaft with bearings being inserted midway perpendicular to the beam and being rotated by the action of the two units mounted on the ends of the beam. Additional units can be mounted on additional beams attached to the power take off shaft to increase the power output. The power source consists of an electro magnet used to exert a precessional force on a ferromagnetic gyro disk rotated at high speed by an electric motor, the direction of precession depending on direction of such rotation. The precessionally displaced angular velocity of the ferromagnetic gyro disk provides the force to rotate the beam and turn the power take off shaft. The device of the present has the potential to furnish more torque horse power at the power take off shaft than could be produced by a conventional electric motor drawing the same amount of power required to drive the device of the present invention. There are many applications for such an increase in electric power efficiency.

DETAILED DESCRIPTION OF THE PREFERRED EMBODIMENT DETAILED DESCRIPTION

Figure 1:
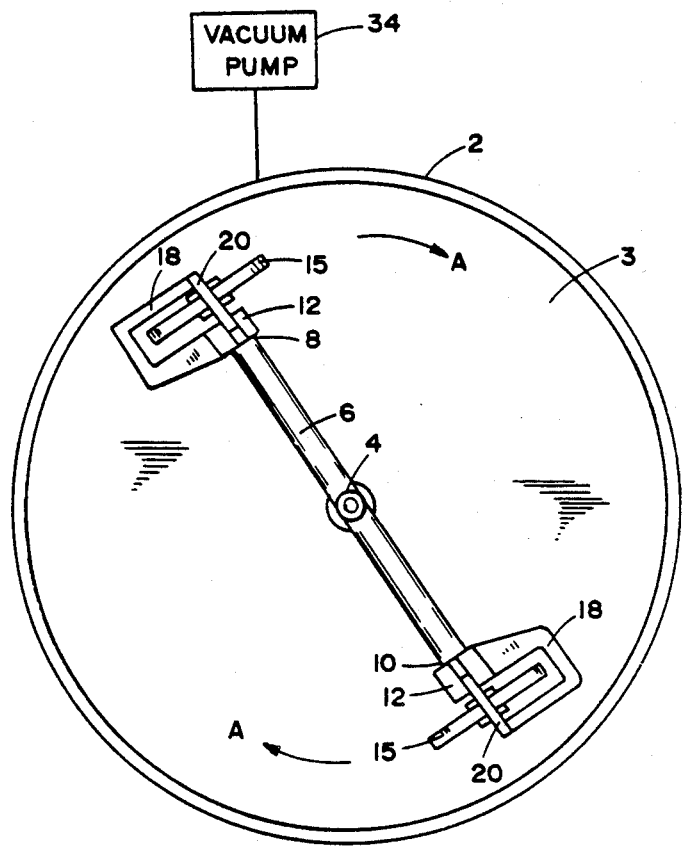
FIG. 1 is a top plan view of a device for generating rotational force embodying the invention as seen with top cover removed from the containment enclosure.
Figure 3:
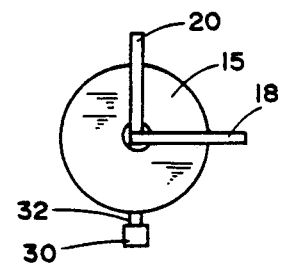
FIG. 3 is an elevational view of the ferromagnetic disk of the device of FIG. 1.

For the purpose of promoting an understanding of the principals of the invention, reference will now be made to the embodiment illustrated in the drawings and specific language will be used to describe the same. It will nevertheless be understood that no limitations of the scope of the invention is thereby intended, such alterations and further modifications in the illustrating device and such further applications of the principals of the invention therein being contemplated as would normally occur to one skilled in the art to which the invention relates.

Figure 2:
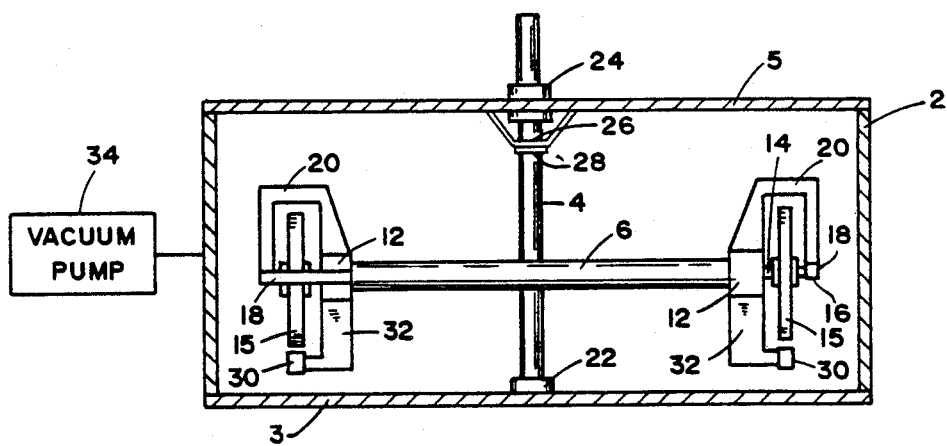
FIG. 2 is a view of the device of FIG. 1 directly from the side with the near side of the containment enclosure removed.

Referring to FIG. 1, a containment enclosure 2 has a center mounted power take off shaft 4 to which is attached a beam 6 on the opposing end 8.70 of which are attached electric motors 12, each having a center line shaft 14, FIGS. 2 each of which drives a ferromagnetic gyro disk 15. A shaft support bearing 14, FIG. 2 supported by a shaft support bearing bracket 18 supports the center line shaft 14. An additional shaft support bearing bracket 20 is shown in FIG. 2.

Referring to FIG. 2, the means of mounting within the containment enclosure 2 by the use of thrust bearing 22 and the inverted thrust bearing 24 is shown. Fixed electrical contact 26 and moving electrical contact 28 provide a means of power transmission to electric motor 12 and electro magnet 30 supported by electro magnet support brackets 32 attached to the electric motors 12. Oil lines (not shown) can furnish oil to bearings 22 and 24 and to the electric motors 12. Oil pressure can be furnished by an oil pump (not shown) geared to power take off shaft 4. Vacuum pump 34, electrically driven, is employed to partially evacuate the containment enclosure 2 to reduce air resistance within containment enclosure 2. Electro magnets 30 exert precessional force on the ferromagnetic gyro disks 15, respectively, and the precessionally displaced angular velocity of the ferromagnetic gyro disks 15 provides the force to cause rotation of beam 6 turning power take off shaft 4.

FIG. 1 serves to further illustrate the placement of the mechanism in the containment enclosure 2 and the direction of rotation of beam 6 in arrow direction A when the ferromagnetic disks 15 are rotating counter-clockwise relative to beam 6.

The device of the present invention may have a control system having an on and off switch common for electric motors 12 driving ferromagnetic gyro disks 15 and power regulating switches to control the rotational speeds and the synchronization of the rotational speeds of the electric motors 12 driving the ferromagnetic gyro disks 15. The control system may also have an on and off switch common to electro magnets 30 and power regulating switches for the purpose of controlling and synchronizing the strength of the magnetic fields of the electro magnets 30. The control system may also have a governor to control the rotational speed of the central power take off shaft 4 by manipulation of the power regulating switches controlling the rotational speeds of the electric motors 12 driving the ferromagnetic gyro disks 5 and the power regulating switches controlling the strength of the magnetic fields of the electro magnets 30.

It is to be understood that although a device for generating rotational force about an axis has been illustrated, the various features of the disclosed invention are equally well suited to virtually any type of device for generating rotational force and although various materials and connecting techniques are possible, the optimum materials and dimensions will depend in part on the basic style and size as well as the intended application.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for generating rotational force about an axis of rotation comprising:
   a beam having a longitudinal axis supported in a housing and rotatable about an axis of rotation perpendicular to said longitudinal axis of said beam;
   disk means mounted on the longitudinal axis of said beam rotatable about said longitudinal axis of said beam;
   motor means for rotating said disk means; and
   means disposed proximate said disk means for inducing precession of said disk means in a direction of rotation of said beam when said disk means is rotated and causing said beam to rotate about said axis of rotation.

2. The device as claimed in claim 1 wherein said disk means comprises a ferromagnetic disk and wherein said precession inducing means comprises magnet means positioned normal to the direction of rotation of said beam.

3. The device as claimed in claim 2 wherein said beam has opposing end portions and said ferromagnetic disk means comprises first and second ferromagnetic disks mounted, respectively, on said opposing end portions of said beam.

4. The device as claimed in claim 3 wherein said motor means comprises first and second electric motors coupled, respectively, to said first and second ferromagnetic disks.

5. The device as claimed in claim 4 wherein said magnet means comprises first and second electromagnets supported, respectively, by first and second brackets mounted, respectively, on said opposing end portions of said beam.

6. The device as claimed in claim 5 further comprising a power takeoff shaft coupled to said beam and journaled in said housing.

7. The device as claimed in claim 6 wherein said housing comprises a sealable enclosure and further comprising vacuum pump means for evacuating the sealed enclosure.

* * * * *

UNITED STATES PATENT AND TRADEMARK OFFICE
CERTIFICATE OF CORRECTION

PATENT NO. : 5,109,719

DATED : May 5, 1992

INVENTOR(S) : Oscar W. Pipkins, Jr.

It is certified that error appears in the above-identified patent and that said Letters Patent is hereby corrected as shown below:

On the title page: Item[75] Inventors: change the name of the inventor from "Oscar W. Piokins, Jr." to --Oscar W. Pipkins, Jr. --.

Column 1, line 56, change "70" to -- 10 --.

Signed and Sealed this

Twenty-second Day of June, 1993

Attest:

MICHAEL K. KIRK

*Attesting Officer*   Acting Commissioner of Patents and Trademarks